United States Patent [19]

Elsey

[11] Patent Number: 4,879,542

[45] Date of Patent: Nov. 7, 1989

[54] ALARM SYSTEMS

[76] Inventor: Adrian C. Elsey, The Middle House, Maidenhatch, Pangbourne, Reading RG8 8HJ, Berks, United Kingdom

[21] Appl. No.: 235,905

[22] Filed: Aug. 24, 1988

[51] Int. Cl.⁴ .......................... G08B 27/00; G08B 1/00
[52] U.S. Cl. ............................... 340/326; 340/309.15; 340/575; 340/576; 340/439; 180/272
[58] Field of Search ........... 340/326, 575, 576, 309.15, 340/309.2, 309.3, 439; 180/272, 271

[56] References Cited

U.S. PATENT DOCUMENTS

| 3,312,508 | 4/1967 | Keller et al. | 340/575 |
| 3,611,344 | 10/1971 | Couper | 340/575 |
| 3,922,665 | 11/1975 | Curry et al. | 340/575 |
| 4,300,124 | 11/1981 | Vasquez | 340/309.15 |
| 4,331,953 | 5/1982 | Blevins et al. | 340/309.15 |

FOREIGN PATENT DOCUMENTS

WO86/0146 8/1986 PCT Int'l Appl. .
745768 2/1956 United Kingdom .
988762 4/1965 United Kingdom .
1318891 5/1973 United Kingdom .
1416425 12/1975 United Kingdom .
1578525 11/1980 United Kingdom .

Primary Examiner—Donnie L. Crosland
Attorney, Agent, or Firm—Thomas R. Morrison

[57] ABSTRACT

An alarm system to keep an aircraft pilot or a vehicle operator alert utilizes a first timer to activate visual alarm. The first timer is reset by actuation of the aircraft communications press-to-talk button. If the pilot fails to reset the first timer within a predetermined time, a second timer triggers an audio alarm. Once the audio alarm is triggered, it remains triggered and not resettable for a predetermined period of time. During normal operation of an aircraft during landings and takeoffs, the communications press-to-talk button is actuated as part of normal cockpit operations at intervals shorter than the time for the first timer to complete its timing cycle. Accordingly, an alarm is not generated during such landings and takeoffs, but is effective during cruise flight when the danger of drowsiness is greatest.

16 Claims, 3 Drawing Sheets

ALARM SYSTEMS

BACKGROUND OF THE INVENTION

1. Field of the Invention

This invention relates to alarm systems and has been conceived in the context of providing an alarm for an aircraft pilot in order to ensure that the pilot is kept alert whilst on duty. Accordingly, the invention will be discussed primarily in this context but it should be noted that the invention has wider application.

2. Description of the Prior Art

The problem of aircraft pilot fatigue resulting in dozing or sleeping whilst on duty is of increasing concern in view of the very serious safety hazard it represents. The problem is particularly relevant to single-pilot and dual-pilot aircraft although this is not to say that the likelihood of three or more pilots falling asleep simultaneously in a given aircraft is remote. Accordingly, the alarm system of the present invention is applicable to all aircraft and, as will be appreciated, has a much wider application in as much as it is appropriate for use by any "operator" of equipment. For example, it is applicable to all road users as there are many instances of drivers falling asleep behind the wheel. It is equally applicable to the operators of watercraft. Furthermore, the invention can be of advantage to the operator of any type of equipment the lack of control of which could have dire consequences.

SUMMARY OF THE INVENTION

According to the present invention there is provided an alarm system comprising first timer means operable, in use, to produce an electrical output signal on timing out, visual alarm means responsive to the output signal from the first timer means, second timer means responsive to the output signal from the first timer means to initiate its operation and operable to produce an electrical output signal on timing out for energizing audio alarm means, and reset means associated with the first timer means, whereby first a visual alarm is provided followed by an audio alarm unless the first timer means is reset prior to the second timer means timing out.

The first timer means preferably is made variable to suit the requirement of the user and the second timer means may be fixed. Furthermore, the visual means may be in the form of a light-emitting diode (LED), for example, and which may be of the dual-type which can be permanently energised in use of the alarm system to indicate overall operation and arranged to flash when responding to the output signal from the first timer means. The LED may be such as to show one color when permanently energised, for example green, and an additional or different color, for example amber, when responding to the output signals from the first timer means.

The audio means may be provided as part of the system and may be of any desired form, and a volume control therefor may be provided. The audio means may be included in a unit containing the first and second timer means and the visual alarm means, or may be provided remote therefrom. Likewise the visual alarm means may be disposed remote from the unit.

Third timer means may be provided which is rendered operative only when the audio alarm means is enabled, the third timer means serving further to enable the audio alarm means at preselected intervals until the third timer means times out. The provision of third timer means helps an operator to stay awake once he has been awoken by the initial energization of the audio alarm means.

In the application of the invention to an alarm system for an aircraft pilot, the alarm system is preferably connected into the standard Station Box or audio select panel fitted to most aircraft and which enables a pilot to make selections for receiving and transmitting radio messages and for communicating internally with other flight crew members. Normally, the headset for each pilot plugs into a pair of sockets located adjacent the pilot and connected to the Station Box but may be plugged into the alarm system of the present invention, with the system itself plugged into the normal headset sockets. Alternatively, the alarm system may be an integral part of the aircraft instrumentation in general and, for example, the Station Box in particular. With either of these arrangements, the reset means for the first and second timer means may be the R/T switch which has to be operated by the pilot in order to transmit messages and for internal communication and is always conveniently placed on the joystick for ease of operation without having to remove a hand from the joystick. Accordingly, it is a very simple operation for the pilot to reset the alarm system which he may do at any time, such as when he sees the visual alarm or when the audio alarm sounds. Normally, he will wish to reset the alarm system as soon as he sees the visual alarm in order that he is not unnecessarily disturbed by the audio alarm sounding in his headset in case this should interfere with other communications in progress. The Station Box is normally provided with a hand microphone for use instead of a boom microphone normally attached to the pilot's headset. Operation of the switch on the hand microphone may also be arranged to reset the alarm system as may other switches and/or reset buttons such as, for example, the MASTER CAUTION and MASTER FIRE reset buttons which are found on most modern civil aircraft.

In other applications, it will be appreciated that the reset means for the first and second timer means can be located so as to be equally readily operated by the user of the alarm system, for example by way a pressure switch on the steering wheel and/or control pedal of a vehicle.

DESCRIPTION OF THE PREFERRED EMBODIMENT

Figure 1:
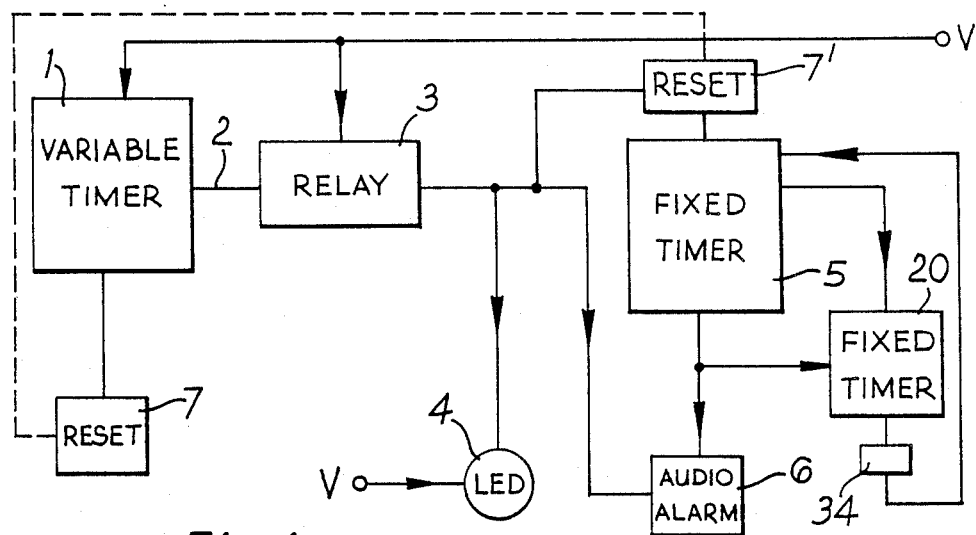
FIG. 1 is a block circuit diagram of the alarm system.

The alarm system illustrated in the accompanying drawings is adapted for use by an aircraft pilot and, as seen from the block circuit diagram of FIG. 1, the alarm system comprises a variable timer 1 which, on timing out following the expiry of a selected delay, produces an electrical output signal on a line 2, which signal operates a relay 3 to supply power to a visual alarm 4, a second and fixed timer 5, an audio alarm 6 and a third and fixed timer 20.

When the timer 5 times out on the expiry of the fixed delay, it produces an electrical output signal which enables the audio alarm 6 and the third timer 20 which serves to re-enable the audio alarm via the fixed timer 5 for a period of three minutes. The visual alarm 4 is a light-emitting diode (LED) of the dual, three-terminal type which will glow one colour (preferably green) on being energised from a voltage source V on switch on of the alarm system, and will flash in a different colour preferably red so as to show amber against the green) when energised as a result of the presence of an output signal from the variable timer 1.

Reset means 7 are provided to reset the alarm system at any point in its sequence of operation except when the third timer 20 has been rendered operative.

Figure 2:
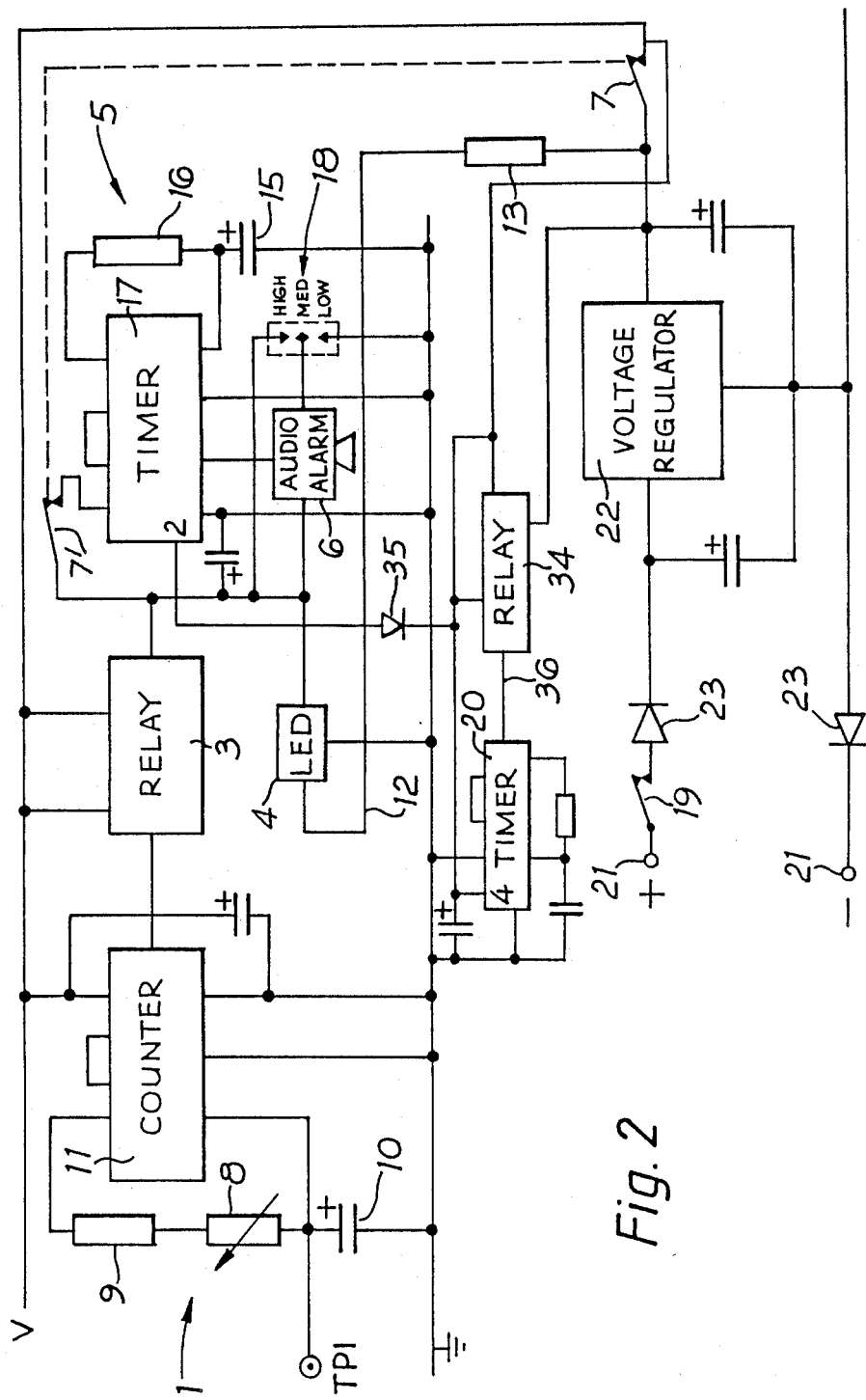
FIG. 2 is a more detailed circuit diagram of the embodiment of FIG. 1.

Turning now to FIG. 2, the variable timer 1 is shown to be in the form of a variable capacitive resistive (CR) network comprising a variable resistor 8, fixed resistor 9 and a capacitor 10. An integrated circuit (IC) 11 counts the pulses generated by the CR network 8,9,10 and when a predetermined number of pulses has been counted (the time taken to generate this number depending on the setting of the variable resistor 8), the output of the IC 11 goes low and enables the relay 3, whereupon the regulated power supply V is applied to the LED 4, the fixed timer 5, and the audio alarm 6. The output pin 2 of the second timer 17 is low until the timer times out, whereby the third timer 20 is not initiated. The LED 4 is already energised on one terminal by virtue of its direct connection to the power supply V on lead 12 via a resistor 13 and, as already stated, preferably is arranged so that the one part glows green to show that the alarm system is operative. When energised further on a second terminal (the third terminal being at ground potential) via the relay 3, the other part of the LED flashes red so as to show amber when seen against the green of the first-part to warn the pilot visually that the first timer 1 has timed out and that if he does not reset the system, the second timer 5 will shortly time out and enable the already energised audio alarm 6 so that a warning will sound in the pilot's headset 14 (FIG. 3) as will be explained.

The fixed timer 5 comprises a fixed CR network 15,16 and an IC 17 similar to the IC 11. three-position switch 18 is shown in associated with the audio alarm 6 and this is to provide three different frequencies of operation of the alarm, which facility may be omitted.

If the timer 17 times out and the alarm 6 energised, the signal on pin 2 of that timer goes high, whereby power is supplied to the third timer 20 and an associated relay 34 via a diode 35, the signal on the line 36 between the third timer and the relay being low. Operation of the relay results in the switch 7 being bypassed and power being latched on to pin 4 of the third timer 20 and pin 2 of the relay 34. The diode 35 protects the output pin 2 of the second timer 17 when the second timer 17 is reset via a switch 71 ganged with the switch 7, and pin 2 goes low. The relay 34 is held on until the third timer 20 times out and pin 2 of that timer goes high. This removes the bypass from the switch 7 and disables the third timer 20 and the relay 34. Normal reset can then be effected. However, whilst the relay 34 is on, the audio alarm 6 is energised for a period of three minutes at one minute intervals to ensure that the pilot is kept awake for this period.

The reset means 7 is in the form of a normally-closed switch as seen in FIG. 2 which preferably is represented by a spare pair of contacts on the R/T switch of a Station Box which will be referred to hereinafter. Thus, when the ON/OFF switch 19 is closed, the power supply V is applied to the second terminal of the LED 4 on the lead 12, to the first timer 1 and to the relay 3, via the closed reset switch 7. When the reset switch 7 is momentarily opened, the power supply to the LE second terminal, the first timer 1 and the relay 3 is interrupted, whereby both the first timer 1 and the second timer 2 are reset, the LED 4 ceases to flash and the first timer commences timing afresh when the reset switch 7 is re-closed.

Figure 3:
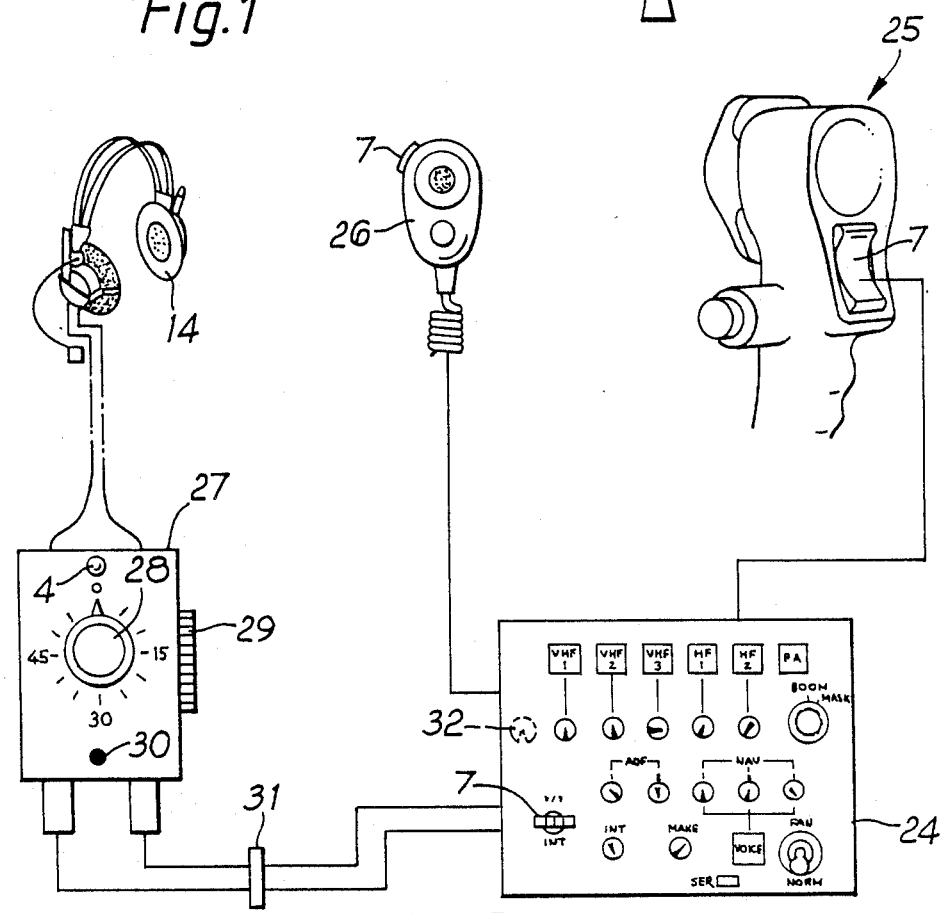
FIG. 3 is a pictorial representation of the alarm system of FIG. 1 as fitted to an aircraft.

The power supply for the alarm system comprises an input terminals 21 for connection to a DC supply in the range 8–35 volts so as to be universal in respect of receiving inputs from 12 volt automobile batteries and 28 volt aircraft batteries, for example. The input voltage is applied to a voltage regulator 22 which produces a 5 volt regulated supply designated V. The regulator 22 is reverse polarity protected to 400 volts DC by two diodes 23. Turning now to FIG. 3, this shows a typical Station Box or audio select panel 24 provided in an aircraft for sending and receiving messages externally and for communicating internally between flight crew members. The audio select panel 24 has an R/T (radio telephony) switch which is used as the reset switch 7 as already explained and this is repeated on the joystick 25 and a hand microphone 26. The pilot's headset 14 would normally be connected into the Station Box via a pair of sockets 31 (FIG. 3) adjacent the pilot but with the use of the present invention is connected via the alarm unit designated 27.

The alarm unit 27 houses all of the circuit of FIG. 2 and has a rotary dial 28 connected to the variable resistor 8 and calibrated from 0 to 60 minutes although this range can be varied to suit the application of the system. The unit 27 also has a volume control 29 for the audio alarm 6 (which control is not shown in FIG. 2) combined with the ON/OFF switch 19. A press-to-test button 30 is also provided on the unit 27.

In use of the alarm system, the unit 27 is connected to the Station Box 24 via the existing headset sockets 31 and the pilot's head set 14 plugged into the unit 27. To use the alarm system, the pilot closes the ON/OFF switch 19, whereupon power is supplied to the LED 4 which glows green to indicate that the alarm system is rendered operative. If desired, the pilot can then press the button 30 to test whether the alarm system is functioning properly, depressing the button sounding the alarm in the pilot's head set 14 and causing the LED 4 to flash amber as described above, this part of the circuit not being shown in the circuit diagram of FIG. 2 of the drawings. The pilot can then adjust the volume if necessary and then select the alarm delay period by rotating the dial 28 as appropriate. The variable timer 1 then begins to generate a predetermined number of pulses in the time period selected and on timing out, the relay 3 is energised, whereupon the LED 4 second terminal is energised so as to flash red (giving amber) in order to advise the pilot that unless he takes action, an alarm will sound in his headset in a predetermined period of time. Conveniently, this period is 1 minute but the fixed timer 5 may be set to any other duration as required. If the visual signal, by way of the flashing LED 4, is ignored or not seen, then the fixed timer 5 will operate and at the duration of the fixed period will produce an output signal to sound the alarm in the pilot's head set 14. It is then necessary to reset the alarm system and this is normally done simply by operating the R/T switch 7 on the joy stick 25, on the hand microphone 26 or on the Station Box 24 itself. The switch 7 is opened by this action so as to interrupt momentarily the power supply to certain components of the alarm system, as already explained, whereupon the variable timer 1 and fixed timer 5 are automatically reset as described above. On resumption of the power supply, the variable timer 1 will automatically commence to count from zero and the alarm system will go through the same cycle of operation as just described. It will be appreciated that it is open to the pilot to operate the R/T switch 7 at any point so as to reset the alarm system, i.e. before the LED 4 flashes amber, when the LED 4 flashes, before the audio alarm sounds or when the audio alarm sounds.

However, once the second timer 17 has timed out, it is not possible to effect this reset until the third timer 20 has timed out, as described above, in order that the alarm 6 is energised at one minute intervals for the next three minutes (or any interval and period required) so as to keep the pilot alert for this period. When the third timer 20 has timed out, then normal reset can be effected by momentarily opening the switch 7 as described.

It will also be appreciated that the alarm system can be used as a reminder system as well as its prime function of keeping the pilot alert when he feels tired. For example, the pilot may use the alarm system to remind him to make a track change; if the next way-point is not due for some 30 minutes or more, then the pilot might set the alarm for 10-15 minute intervals. However, on flight sectors with more frequent track changes, the alarm system may be set for 2 minutes or so. Furthermore, the alarm system can be used to wake a pilot following a rest period.

The audio alarm may be arranged to sound in the pilot's head set and/or through the flight deck loudspeaker or through an existing audio system such as the SELCAL (selective calling) system of an aircraft or the marker beacon system, for example.

The audio alarm 6 is shown, for convenience in FIGS. 1 and 2 as a dedicated alarm with a loudspeaker. However, in the context of aircraft, the output from the fixed timer 5 is used to energise a pulse generator, the output of which will be coupled to the pilot's headset 14 and/or remote loudspeaker, via a coupling transformer so that a bleeping will be heard by the pilot. The frequency of this alarm can be chosen so as to be such as to waken the pilot virtually immediately. Thus the alarm signal can be fed to the headset and/or remote speaker in a similar manner to that employed in the marker beacon system with which an aircraft is fitted.

If the alarm system is integrated with the Station Box or audio select panel, or any other aircraft instrumentation, an ON/OFF and volume control may be included on the Station Panel as indicated in broken lines at 32 in FIG. 3, together with the LED 4, variable timer control and test button. Alternatively, the LED 4, variable timer control and test button may be included in the normal instrument panel so as to be more readily seen and operated, as appropriate, by the pilot. In any of the arrangements described the variable timer control may be the rotary dial 28 as shown in FIG. 3, or may be in the form of a digital display provided with a SET button as illustrated in FIG. 4.

Figure 4:
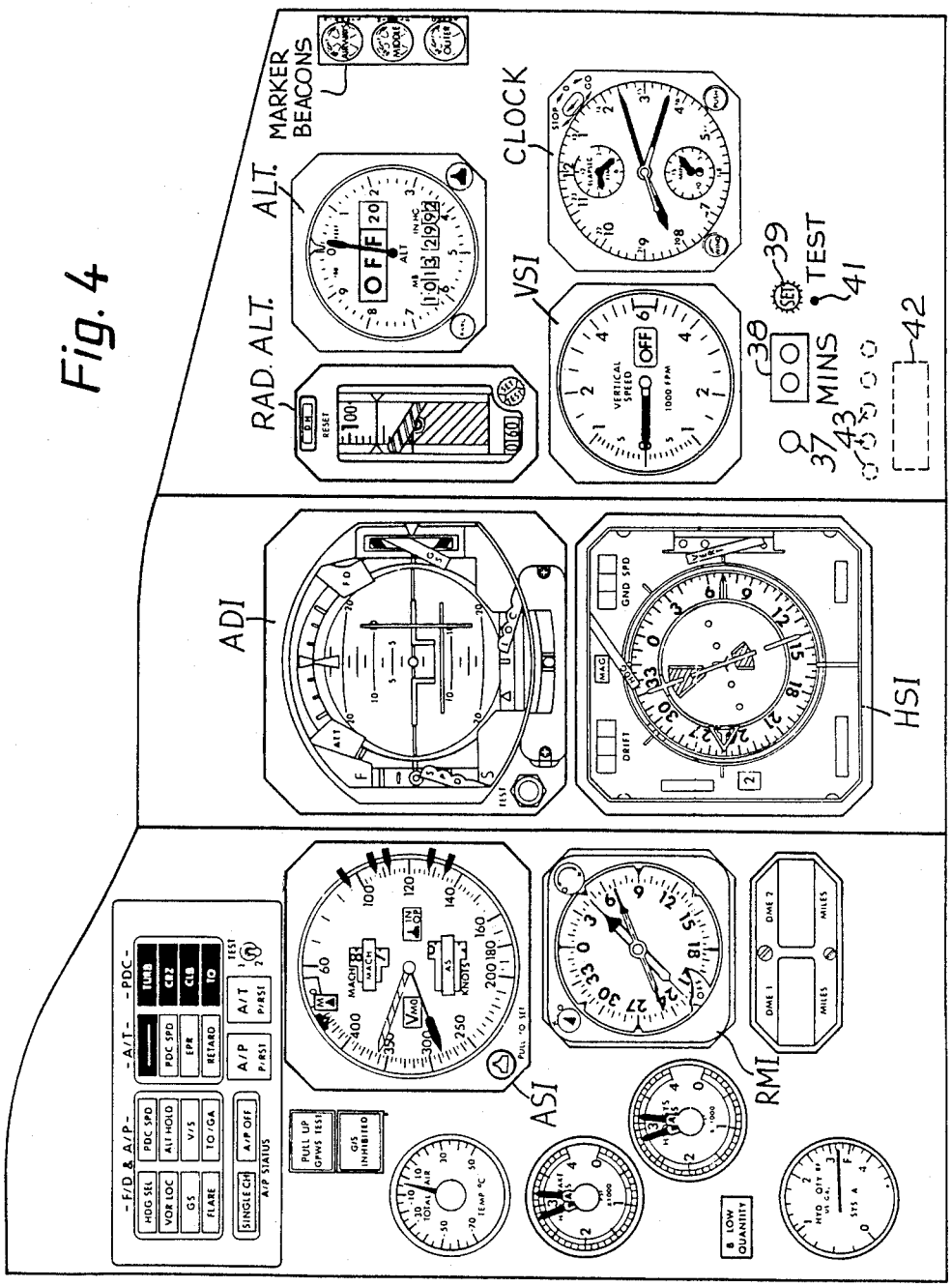
FIG. 4 is similar to FIG. 3 but showing an alternative arrangement.

FIG. 4 illustrates a typical First Officer's instrument panel on a modern aircraft with the conventional airspeed indicator ASI, altitude direction indicator ADI, horizontal situation indicator HSI, radio magnetic indicator for RMI, vertical speed indicator VSI, radio altimeter RAD.ALT., clock, autopilot and flight director A/P, F/D and others not shown.

Below the VSI and clock there is provided an LED 37 which is energised when the alarm system is on to so indicate to the operator, a display 38 showing the time set for the variable timer 1, a SET button 39 to set that time, and a TEST button 41. As an alternative, FIG. 4 also indicates by broken lines a liquid crystal display 42 in place of the display 38, and a series of five LEDs 43 all of which are energised as the alarm system is set and are de-energised in sequence as the variable time period set into the timer 1 elapses. Thus the operator has a visual indication at a given instant of the point reached in the time period of the first timer 1. If and when the first timer 1 times out, all the LEDs 43 will flash.

The alarm system may be arranged to be switched on manually or automatically, the latter being preferred to ensure that it is always rendered operative. In the latter respect, the normal so-called weight switch associated with the undercarriage of the aircraft may be used. Alternatively, the ALTITUDE HOLD switch may be used on the basis that until this switch is operated the pilot is busy with demanding take-off procedures and is unlikely to need to be kept alert. A further alternative is to arrange for the alarm system to be rendered operative a predetermined time after take-off.

In aircraft requiring two or more flight deck crew, each crew member will have an alarm system and the systems are preferably interconnected so that if the audio alarm 6 of one system is enabled, it will sound in the headset and/or loudspeaker system of all of the other systems.

It will be appreciated that the present invention can be implemented in terms of software, such an implement lending itself well to incorporation into the flight management systems of modern aircraft.

The alarm system of the present invention lends itself to modular design so that it can be transportable with its own power supply and integral reset switch. Thus, a pilot could carry his own alarm system for use separately or in conjunction with the aircraft Station Box or audio select panel, for example, as described. In view of the fact that the component count is low, the circuitry may readily be adapted for an application requiring varying timing periods, supply voltage levels or alarm operation. For volume production, consideration could be given to the use of applications specific integrated circuits (ACICS) utilising large scale integration (LSI) to provide all the timing, input and output functions on one chip.

It will also be appreciated that the invention has a wide application and is not restricted to the use by an aircraft pilot. Drivers of automobiles, HGV's, coaches etc. would find the alarm system extremely useful in preventing them from falling asleep at the wheel. Also, the operators of potentially dangerous equipment, such as earth moving equipment, cranes, etc., would also find the alarm system of advantage. In such applications, the reset function may be provided, for example, by a pressure switch on the steering wheel and/or brake pedal of a vehicle.

I claim:

1. An alarm system for an aircraft having a conventional radio/telecommunication (CR/T) system controlled by an radio telephony (R/T switch, said alarm system comprising first timer means operable, in use, to produce an electrical output signal on timing out, visual alarm means responsive to said output signal from said first timer means, second timer means responsive to said output signal from said first timer means to initiate its operation and operable to produce an electrical output signal on timing out for energizing audio alarm means, and rest means associated with said first timer means, whereby first a visual alarm is provided followed by an audio alarm unless said first timer means is rest prior to said second timer means timing out, said reset means comprising switch means actuated by actuation of said R/T switch.

2. An alarm system according to claim 1, and further comprising third timer means which are rendered operative only when said audio alarm means is enabled, said third timer means serving further to enable said audio alarm means at preselected intervals until said third timer times out.

3. An alarm system according to claim 1 or 2, wherein said first timer means is variable.

4. An alarm system according to claim 1 or 2, wherein said second timer means is fixed.

5. An alarm system according to claim 1 or 2, wherein the visual alarm means comprises a series of light-emitting diodes which are all energized at the start of the time period of the first timer and are de-energized in turn as that period elapses.

6. An alarm system according to claim 5, wherein the light-emitting diode is of the dual-type which, in use, is permanently energised to indicate overall operation of the alarm system, and arranged to flash when responding to the output signal from the first timer means.

7. An alarm system according to claim 1, and further comprising a unit containing said first and second timer means, visual alarm means and said audio means.

8. An alarm system according to claim 1, wherein said alarm means comprises a tone generator, the output of which is coupled to a pilot's headset.

9. An alarm system according to claim 1, wherein the output of the alarm means is connected to the headset of each member of the flight deck crew of the aircraft.

10. An alarm system for an operator-operable transportation device comprising:

first timer means operable to produce a first electrical output signal on timing out;

visual alarm means responsive to said first electrical output signal from said first timer means;

second timer means responsive to said first electrical output signal from said first timer means to initiate its operation and operable to produce a second electrical output signal on timing out for energising audio alarm means;

reset means associated with said first timer means;

means to help said operator to stay awake for a predetermined amount of time once the had been awaken by said audio alarm means, said means including a third timer means rendered operative only when said audio alarm means are initially activated, said third timer means activating said audio alarm means at preselected intervals until said third timer means times out; and means for preventing resetting of any timer means until said third means times out.

11. The alarm system according to claim 10, wherein said first timer means is variable.

12. The alarm system according to claim 10, wherein said second timer means is fixed.

13. The alarm system according to claim 10, wherein:
the visual alarm means comprises a plurality of light-emitting devices; and
means for sequentially changing an energization condition of said light-emitting devices during a timing cycle of said third timing means.

14. The alarm system according to claim 13 wherein at least one of said plurality of light-emitting devices is a light-emitting diode, said light-emitting diode is of a dual-type which, in use, is permanently energized to indicate overally operation of the alarm system, and includes means permitting said light-emitting diode to flash when respondiing to the first output signal from the first timer means.

15. The alarm system according to claim 14, wherein said flash is a different color from a color indicating overally operation of said alarm system.

16. The alarm system according to claim 10 further comprising a unit containing said first and second timer means, visual alarm means and said audio means.

* * * * *